United States Patent [19]
Durbin et al.

[11] 4,048,834
[45] Sept. 20, 1977

[54] APPARATUS FOR FORMING SERPENTINE HEAT EXCHANGERS

[75] Inventors: Charles R. Durbin; Bernard W. Schoenbachler, both of Louisville, Ky.

[73] Assignee: General Electric Company, Louisville, Ky.

[21] Appl. No.: 677,505

[22] Filed: Apr. 15, 1976

[51] Int. Cl.² .................... B21D 11/07; B21D 53/06
[52] U.S. Cl. ........................................ 72/294; 72/307; 72/DIG. 16; 29/157.3 A; 113/118 V
[58] Field of Search ................ 72/149, 152, 156, 159, 72/294, 306, 307, 318, 369, 304, DIG. 16, 310; 29/157.3 A, 157.3 AH, 157.3 B, 33 G; 113/118 A, 118 B, 118 V

[56] References Cited

U.S. PATENT DOCUMENTS

| | | | |
|---|---|---|---|
| 370,652 | 9/1887 | Phillips | 72/DIG. 16 |
| 2,453,868 | 11/1948 | Shaw, Jr. | 72/DIG. 16 |
| 2,814,327 | 11/1957 | Charlton | 72/159 |
| 2,882,953 | 4/1959 | Huet | 72/159 |
| 3,240,048 | 3/1966 | Callendar | 72/369 |
| 3,475,938 | 11/1969 | Whitney, Jr. | 72/159 |
| 3,680,347 | 8/1972 | Schenck | 72/217 |
| 3,722,251 | 3/1973 | Withrow | 72/294 |
| 3,733,885 | 5/1973 | Brauer | 72/461 |
| 3,742,749 | 7/1973 | Bondarenko et al. | 72/306 |
| 3,762,196 | 10/1973 | Kempken | 72/294 |

FOREIGN PATENT DOCUMENTS

| | | | |
|---|---|---|---|
| 2,003,104 | 11/1969 | France | 72/149 |

Primary Examiner—Michael J. Keenan
Attorney, Agent, or Firm—Frank P. Giacalone; Francis H. Boos

[57] ABSTRACT

A machine for forming a serpentine heat exchanger having a predetermined length from a continuously formed spine fin tubing. A supply of continuously formed spine fin tubing is directed to a forming and bending head in predetermined increments where it is bent in alternate directions about a central axis to form the serpentine heat exchanger. Prior to the bending action the portion to be bent is deformed into a cross section having its major axis parallel with the longitudinal axis of the tube and perpendicular to the central axis. The following bending operation causes the tube diameter across the major axis to decrease as the wall in the area of the outer curve migrates radially inwardly due to its failure to elongate sufficiently, in effect, the cross sectional area in the completed bent portion is substantially equal to the cross sectional area of the tube before the deforming and bending operation.

3 Claims, 19 Drawing Figures

APPARATUS FOR FORMING SERPENTINE HEAT EXCHANGERS

BACKGROUND OF THE INVENTION

1. Field of the Invention

This invention relates generally to a machine for forming a serpentine heat exchanger having a preselected length from a continuous supply of tubing. The machine includes a feed mechanism that advances tubing in preselected increments to a forming and bending head which deforms the section of tubing to be bent prior to successively bending each of the increments in alternative direcions.

The tubing is deformed in the bend area into an elliptical or oval configuration having its major axis parallel to the longitudinal axis of the tube and perpendicular to the central axis. During the bending operation the wall in the area of the outer curve moves radially inwardly to decrease the dimension of the major axis due to its inability to elongate sufficiently, while the dimension of the minor axis increases so that a tube passageway having a predetermined design area is maintained. After a predetermined number of successive bending operations have been completed the serpentine heat exchanger formed by the present invention is severed or cut off from the continuous tube at a precise design point to eliminate any need for successive cutting operations and in effect the elimination of scrap and waste is realized.

2. Description of the Prior Art

In the manufacture of serpentine heat exchangers it has been common practice to provide a length of tubing which was bent either between a wheel or shoe with the inside of the tube occupied by a mandrel to maintain the roundness of the tube passageway during the bending operation.

In actual practice it is extremely difficult to provide the exact length of tubing for a particular serpentine heat exchanger to be formed, and, in fact, the length of tubing provided is usually longer than the design length of the completed heat exchanger. This practice is necessary to allow for variations due to stretch and size of bend radiuses. Accordingly the heat exchanger as formed must then be trimmed to the exact length needed for a particular application which, results in a certain amount of waste or scrap.

The practice of employing internal mandrels has many disadvantages, for example, the length of the tubing in the heat exchanger is limited by the length of the mandrel. In practice when using tubes having a 0.375 inch diameter, the maximum practical length of the mandrel has been found to be about 25 feet. As a result, in many instances, several heat exchangers so formed must be joined to provide some of the volume requirement when they are used in refrigeration systems. Other disadvantages arise when the madrel scores the inner wall surface of the tubing which may lead to undesirable refrigerant flow characteristics. The use of internal mandrels also in some instances allow contaminants to be present in the final heat exchanger. These contaminants, when present and if not removed, may lead to blockage in the refrigerant system, especially in restricted areas such as capillary tubes and could result in compressor failure.

SUMMARY OF THE INVENTION

The present invention provides a machine for forming a serpentine heat exchange having a predetermined length from a continuous tubing, wherein a forming and bending head is adapted to successively bend increments of the continuous tube in alternate directions about a central axis.

The continuous tube is received in a support structure from a supply of continuous tubing with its longitudinal axis in a plane substantially perpendicular to the central axis of the forming and bending head. Prior to advancing the increments of tubing to be bent about the central axis, the tube is shifted laterally so that the successive increments to be bent are arranged on alternate sides of the central axis diametric to the direction of the bending.

The tube is fed longitudinally in predetermined increments past the head so that a selected portion of the increment, generally the trailing portion to be bent, is arranged between shaping members associated with the forming and bending head. The head is driven longitudinally along its central axis so that the shaping member deforms the selected portion of the increment into an elliptical or oval cross section having its major axis lying parallel to the plane of the tubing. A wall portion of a subsequent increment diametric to the direction of the bending operation is held against lateral movement to insure that a parallel relationship between the increments is attained by the bending operation.

With the selected portion arranged between the shaping members, the head is rotated or oscillated in one direction 180° about the central axis so as to bend the selected portion about the central axis and in effect bring the increment into substantially parallel relationship with the subsequent continuous tube. When the serpentine heat exchanger reaches a predetermined configuration in length it is then severed from the continuous tubing, and the machine then recycles and another sepentine heat exchanger is started from the continuously fed tubing.

In forming the serpentine heat exchanger of the present invention from a continuous tubing, the use of an internally applied mandrel is not possible. Accordingly by the present invention a serpentine heat exchanger is in fact fabricated without employing an internally applied mandrel by deforming the tubing in the area to be bent to allow bending of the tube 180° without collapsing the tube in the bend area.

It is an object of the present invention to fabricate a serpentine heat exchanger from a continuously supplied tube by bennding preselected increments of tubing about a central axis.

Another object of the invention is to deform the tube in the bend area into a cross sectional configuration that will cause the resulting stretching of the wall in the area of the outer curve to reshape the tube walls.

DETAILED DESCRIPTION OF THE INVENTION

Figures 1, 2, 3, 4:
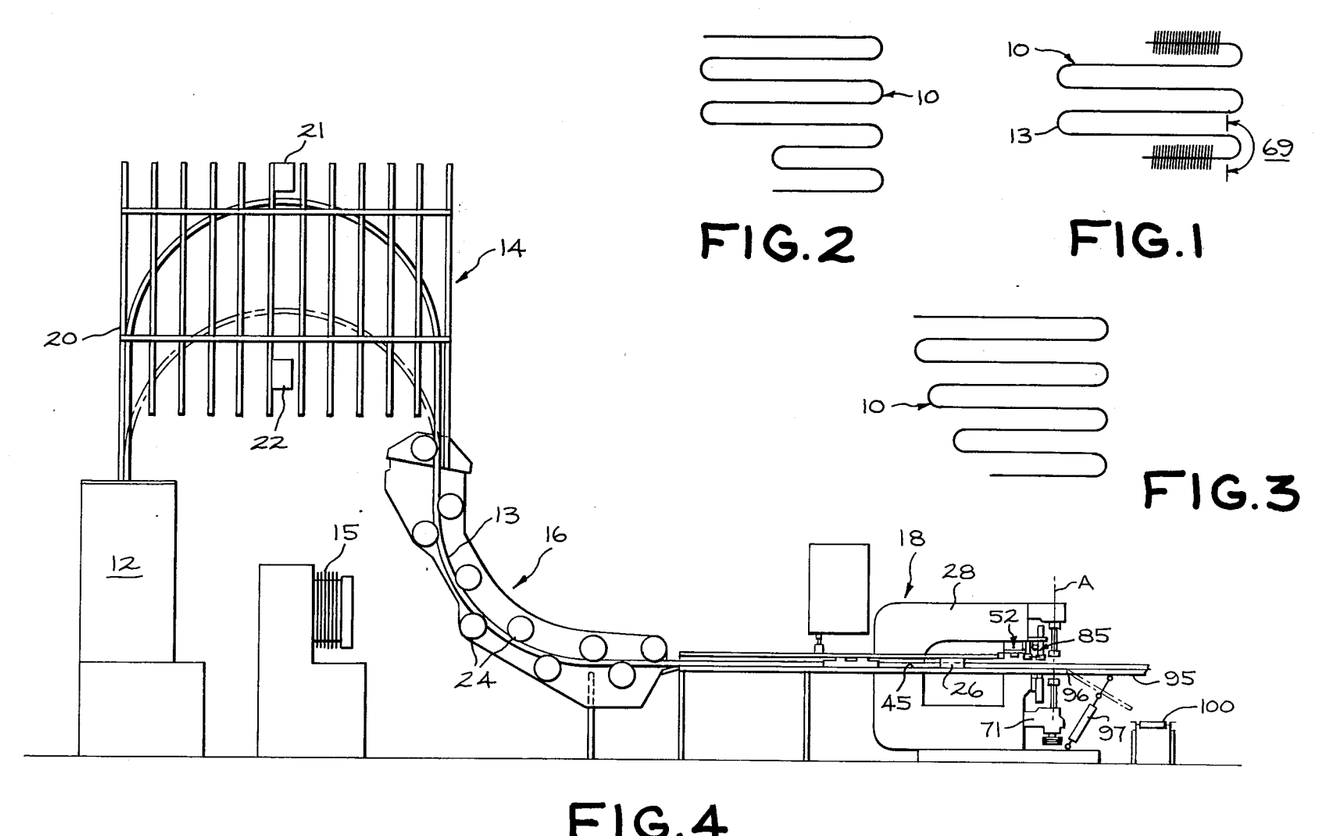
FIG. 1 is a plan view showing a typical serpentine spine fin heat exchanger formed by the apparatus of the present invention.
FIG. 2 is a schematic view of another heat exchanger formed by the apparatus of the present invention.
FIG. 3 is a schematic view of still another heat exchanger formed by the apparatus of the present invention.
FIG. 4 is an elevational view of the apparatus of the present invention.

Referring to FIG. 1, there is illustrated a typical heat exchanger 10 fabricated by the apparatus of this invention wherein increments of spine fin tubing are bent about a central axis A of FIG. 4. While the heat exchanger 10 illustrated includes five return bends joined by tubes of equal lengths it should be understood that by the machine of the present invention a heat exchanger having any number of configurations can be fabricated and FIGS. 2 and 3 illustrate some of the typical variations that may be formed.

With reference to FIG. 4, the preferred apparatus for carrying out this invention may be conveniently divided into components 12, 14, 16 and 18 for ease of description.

Component 12 represent a machine 12 for producing continuous spine fin tubing 13 as shown and described in U.S. Pat. No. 3,688,375-Venables III, assigned to General Electric Company, assignee of the present invention. Component 14 represents a tube feed compensating means which, as will be explained hereinafter, regulates the flow of tubing between the continuous feed of the spine fin forming machine 12 to the increment feed requirements of the heat exchanger 10. Component 16 is utilized to straighten the tube 13 as it enters component 18 which, as will be described in detail, is the serpentine heat exchanger forming machine 18 of the present invention.

The spine fin tubing may be made continually in machine 12 from a rotatably supported stock roll 15 that may contain 2,000 and sometimes as much as 10,000 linear feet of tubing.

Within the present embodiment the heat exchanger 10 is made in conjunction with the spine fin tubing 13 as it is received continuously from the spine fin wrapping machine 12. It should be noted that the completed spine fin tubing 13 may be stored on rolls and the heat exchanger 10 may then be fabricated from material supplied from the rolls.

When, for continuous automatic operation, the spine fin material is received directly from the forming machine 12, means must be provided to compensate between the continuous feed rate of the spine fin forming machine 12 and the intermittent feed requirement of forming machine 18. To this end the feed compensating means 14 includes a holding frame 20 wherein a predetermined length of tubing 13 received from machine 12 may be stored. Switch or control means are provided to regulate between a predetermined minimum and maximum length of tubing 13 stored in frame 20. To this end a control 21 is employed to interrupt the operation of the wrapping machine 12 when the maximum length is sensed and a control 22 to terminate operation of the forming machine 18 when the tubing 13 stored in frame 20 reaches a predetermined minimum length.

The component 16 as mentioned hereinbefore is the tube straightening portion of the apparatus for carrying out the present invention and includes a plurality of spaced rollers 24 arranged on either side of the longitudinal axis of the tube 13 so that axis of the tube 13 as it leaves the final rollers is arranged in a substantially straight line as it enters the forming machine 18.

Figure 5:
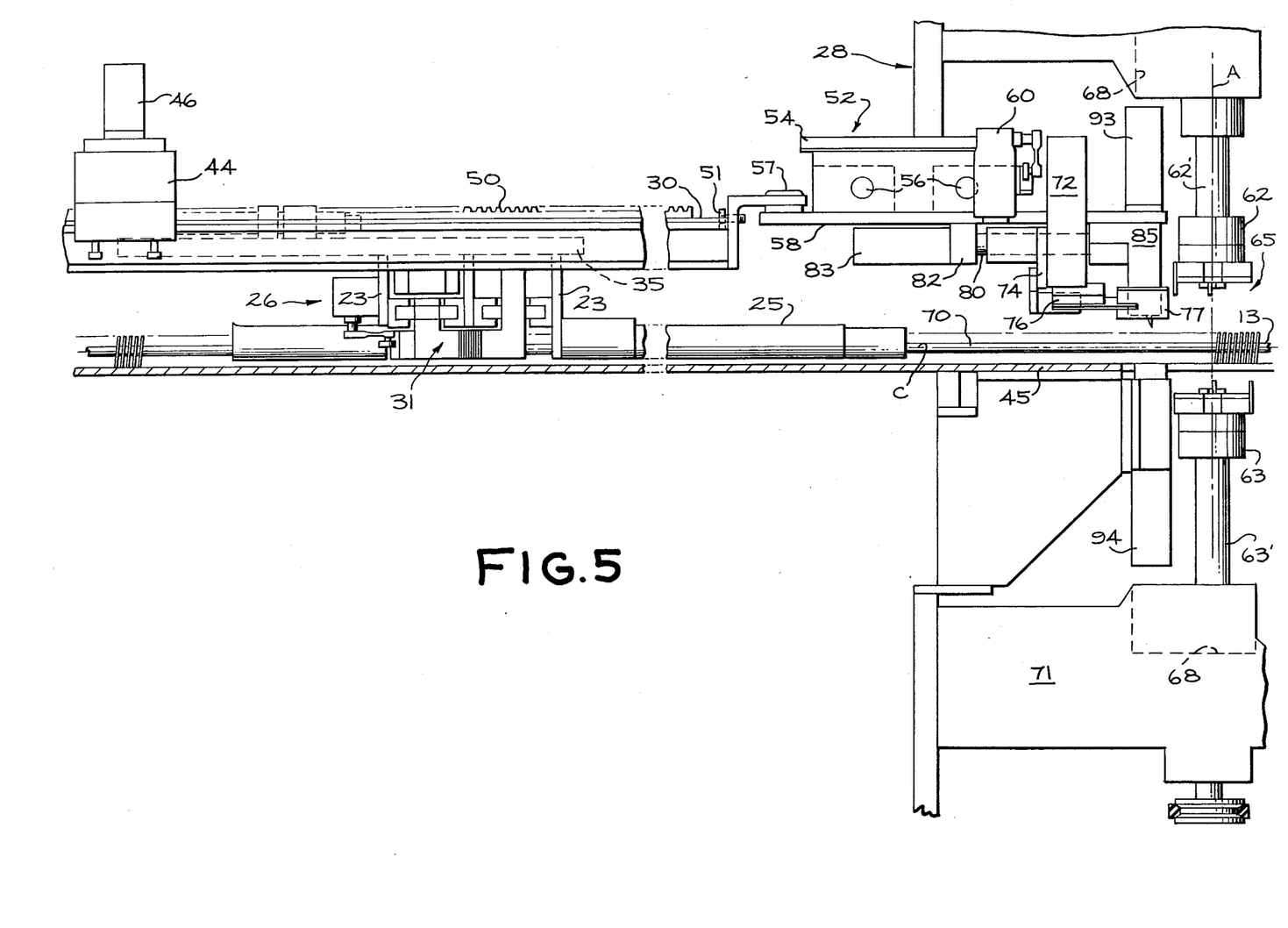
FIG. 5 is an enlarged elevational view of the heat exchanger forming machine of the present invention.
Figure 6:
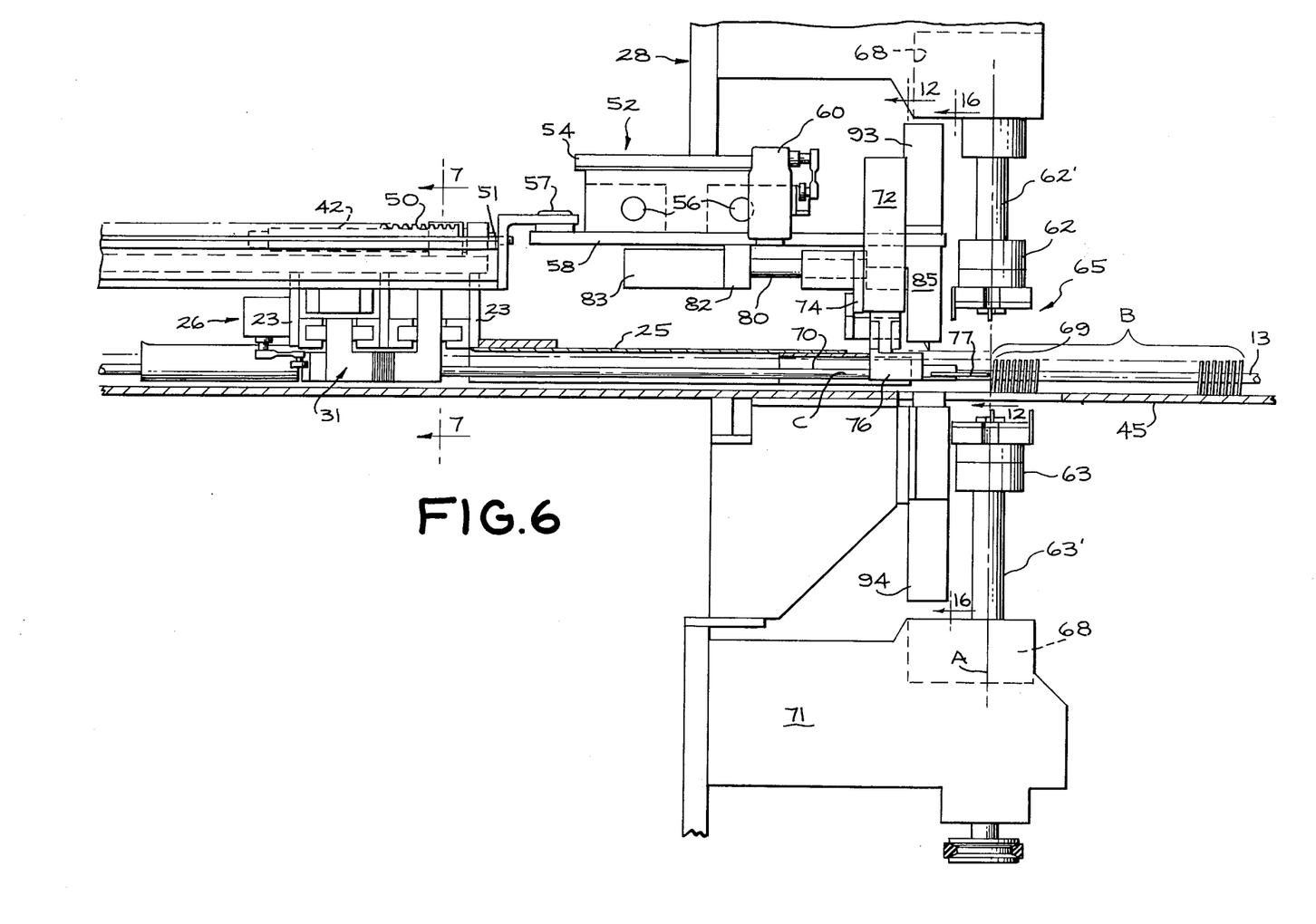
FIG. 6 is similar to FIG. 5 with parts in a second position.
Figure 7:
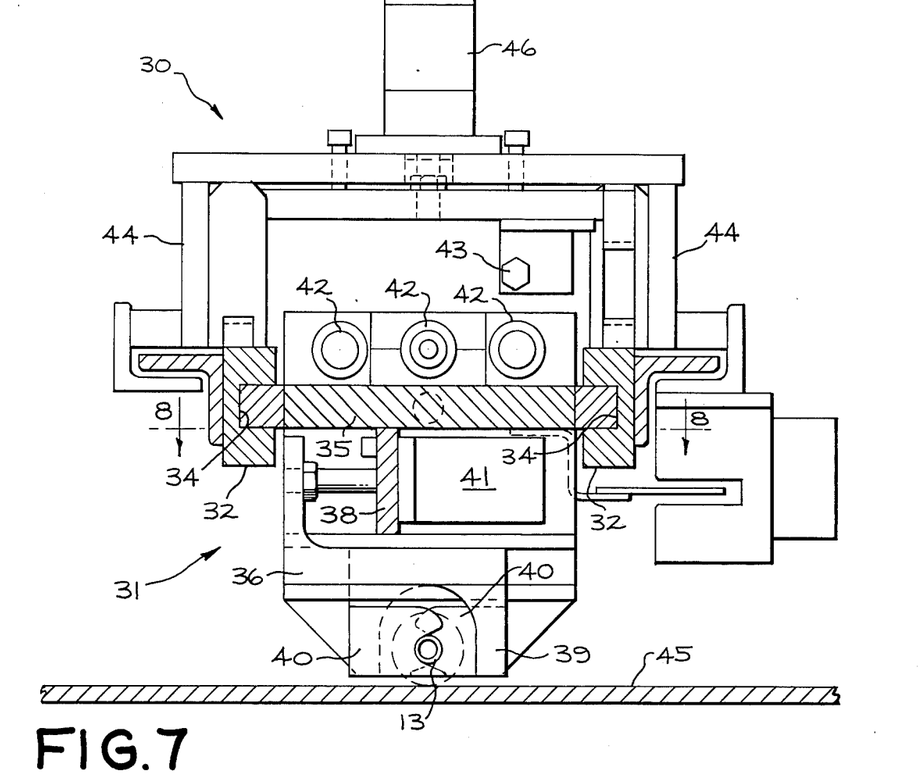
FIG. 7 is an enlarged sectional view taken along lines 7—7 of FIG. 6 shown details of the advancing mechanism.
Figure 8:
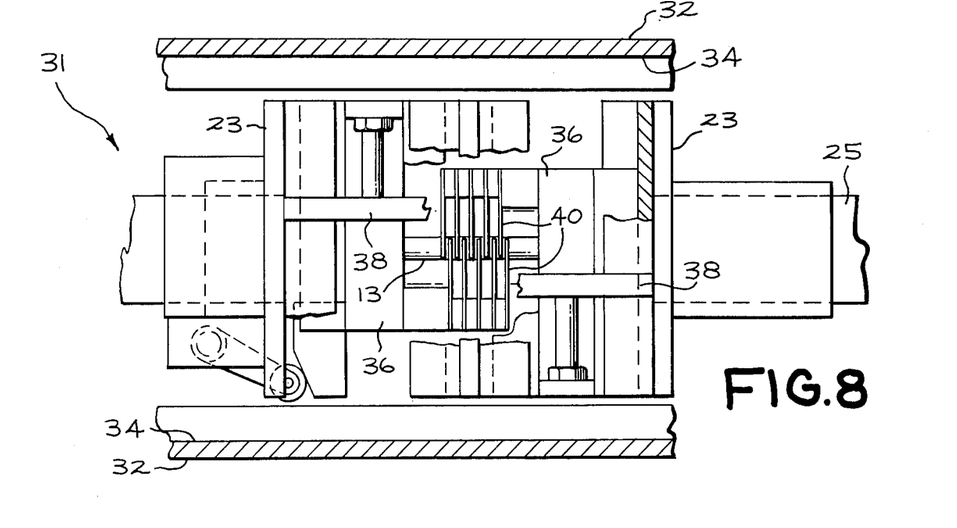
FIG. 8 is a plane view taken along lines 8—8 of FIG. 7 showing further details of the advancing mechanism.

Referring now to FIGS. 4-11 of the drawings, an advancing mechanism 26 arranged in a support structure or frame 28 of the machine 18 is effective in advancing the tube 13 is preselected increments relative to the central axis A. The tube 13 is received in a tubular guide member 25 supported on brackets 23 forming a part of the advancing mechanism 26. The tube guide member 25 is positioned to located the longitudinal axis of the tube 13 so that it lays in a plane C perpendicular to the central axis A. The advancing mechanism 26 includes guide means or slide frame 30 and a tube advancing portion 31 which is arranged for longitudinal movement on frame 30 relative to the central axis A. The frame 30 includes parallel spaced guide rails 32 (FIGS. 7 and 8) which includes recesses or tracks 34 for slidably receiving a support plate 35 of tube advancing portion 31. Arranged on the support plate 35 are a pair of tube holding or gripping members 36 which are movable laterally relative to each other on a bracket 38 secured to plate 35. The lower portion of members 36 includes holding portions 39 which are positioned so as to be arranged diametrically on the longitudinal axis of the tube 13. Secured to the portions 39 are gripping fingers or plates 40 which project radially toward the axis of tube 13 and are adapted to engage tube 13 as shown in FIG. 7. The fingers 40 are spaced so as to extend between the spine fin and engage the tube wall without unduly deforming the fins which could result in loss of heat exchange efficiency. A pair of actuators 41 in the form of actuators of air cylinders arranged on bracket 38 are operable at a selected time to move members 36 relative to each other to cause fingers 40 to engage tube 13 and alternatively to disengage from tube 13.

Figure 9:
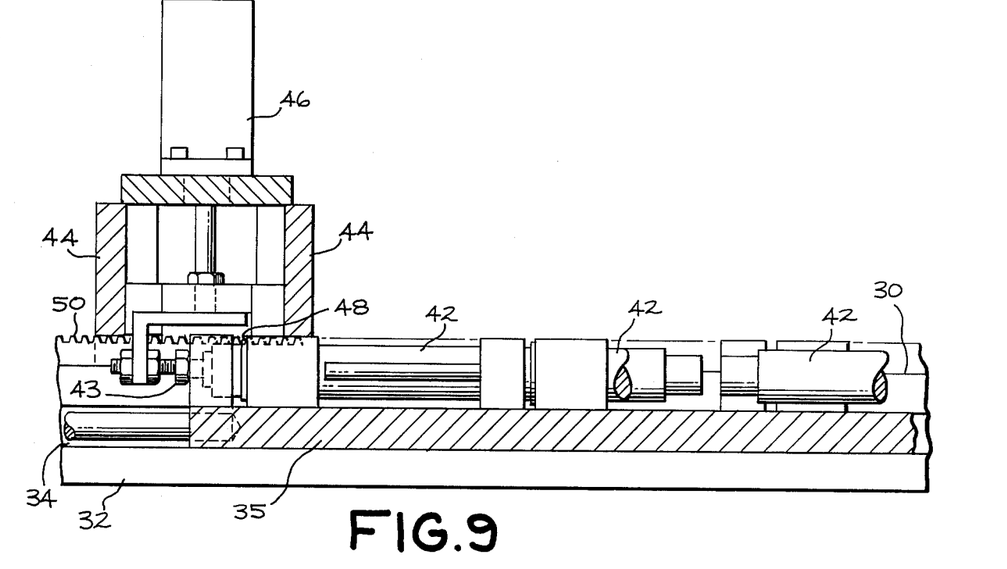
FIG. 9 is an elevational view partly in section showing the indexing portion of the advancing mechanism.
Figures 10, 11:
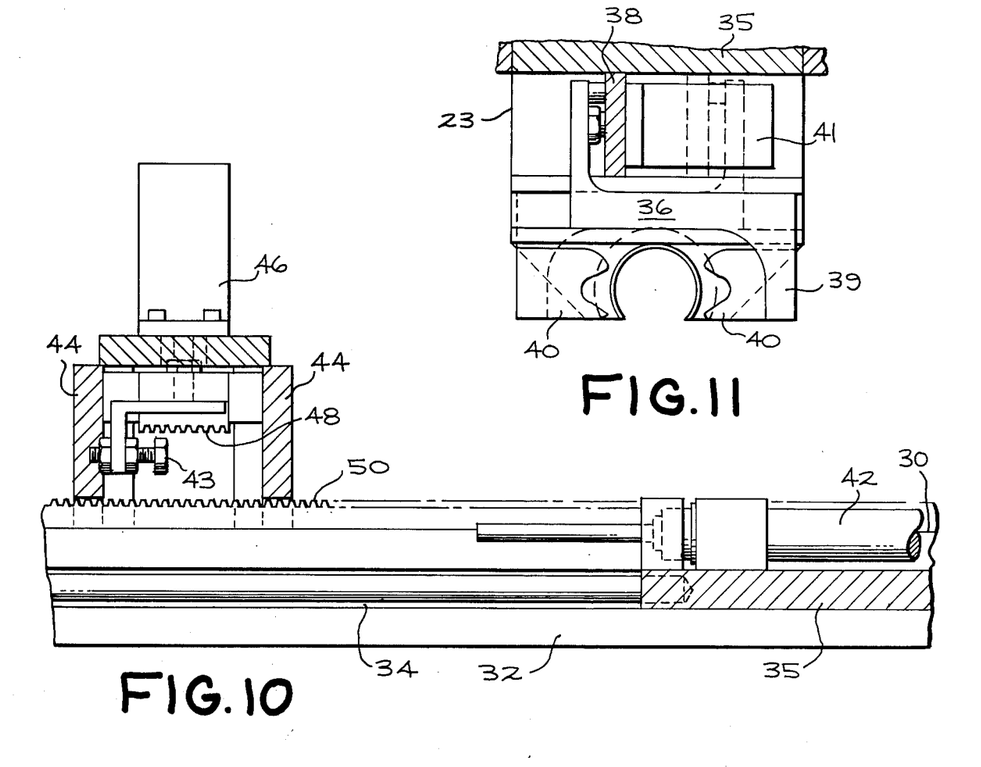
FIG. 10 is similar to FIG. 9 with parts in a second position.
FIG. 11 is a partial elevational view of the advancing mechanism of FIG. 7 with the holding member in a second position.

Mounted on the upper surface of support plate 35 (FIGS. 9 and 10) are a series of dampers 42 which are arranged to engage stop members 43 which are selectively mounted on the stationary frame 30 relative to the central axis. Referring to FIGS. 9 and 10, it will be seen that the stop members 43 are arranged for vertical travel on a support structure 44 which is adjustably mounted on the frame 30. In operation a selected stop 43 is moved by an operating member 46 into the path of a cooperating damper 42 to control and index the tube advancing portion 31 in its retracted position relative to the central axis as shown in FIGS. 5 and 9. The cooperating dampers 42 and stops 43 are arranged axially relative to longitudinal travel of the tube 13 as will be explained hereinafter to provide preselected increments of travel of the tube advancing portion 31. To prevent movement of the stop 43 relative to the frame 30 in impact with the damper 42, a gear rack segment 48 movable with stop 43 engages a cooperating rack 50 secured to the stationary frame 30.

As shown in FIGS. 9 and 10, the retracted position of the advancing portion 31 relative to the central axis, and the length of the tube increment B advances, is determined by the position of the stop members 43 on the frame 30. It should be noted that a selectively located stop 43 must be provided for each desired increment of tube movement to engage a cooperative damper 42. For example, the heat exchanger configuration shown in FIGS. 2 and 3 require that the length of tubing between return bends be different and, accordingly, the advancing portion 31 must be positioned a selected retracted position for each length of increment required.

As the advancing mechanism is retracting to its preselected position relative to the central axis A, the actuators 41 are in their retracted positions as shown in FIG. 11 and accordingly maintain the fingers 40 out of engagement with the tube 13. At the preselected time in the forming operation while the advancing portion 31 is in its selected retracted position against an appropriate stop 43, the actuators 41 are energized and as shown in FIG. 7, the fingers 40 move to engage and grip the tube 13 securely therebetween.

Means are provided to move the advancing portion 31 longitudinally relative to the frame 30. To this end with the tube 13 securely held by the fingers 40, an actuating ram or member (not shown) is energized to move and advance the portion 31 on the frame 30 from the retracted position against a preselected stop 43 as shown in FIGS. 5 and 9, to the advanced position as shown in FIGS. 6 and 10 against a fixed stop 51 secured to frame 30. In this position the selected increment of tubing B has been moved to an advanced position relative to the central axis A. The advanced increment of tubing is supported on a suitable table or support surface 45.

As mentioned hereinbefore, to form the serpentine heat exchanger 10 in accordance with the present invention, the spine fin tubing 13 is bent in alternate directions about the central axis A. Accordingly means are provided for positioning the advanced increment B of tubing on alternate sides of the central axis A.

Figure 12:
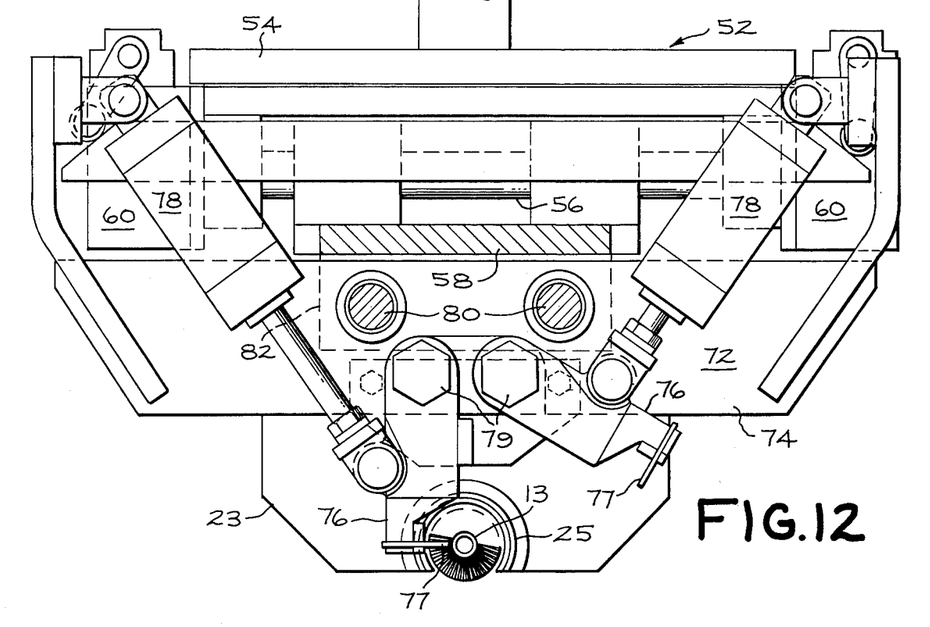
FIG. 12 is an elevational view taken along lines 12—12 of FIG. 6 showing the aligning and shifting mechanism of the present invention.

To this end a shifting mechanism 52 as shown in FIGS. 5, 6, and 12 is arranged on the support 28 for lateral movement relative to the longitudinal axis of the tube 13. The mechanism 52 is mounted on stationary plate 54 which has rails 56 supported therefrom. Slidably mounted on the rails 56 is a platform 58 which is connected to an actuator 60. The slide frame 30 is pivotally connected at 57 to the rearward end of platform 58 so that lateral movement of the platform 58 on rails 56 by the actuator 60 causes the advancing mechanism 26 to shift laterally. This lateral movement of the advancing mechanism 26 carries with it the guide member 25 which concentrically supports the tube 13 and, accordingly, the tube 13 is shifted to a selected side of the central axis A to be in position for the following alternate bending operation.

Figures 13, 14, 15:
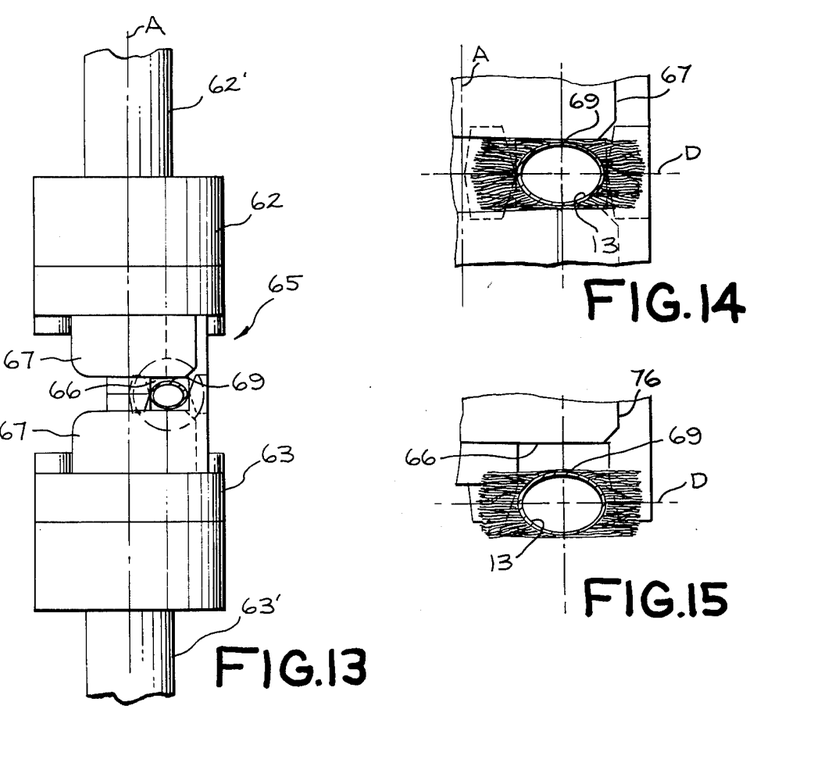
FIG. 13 is a partial elevational view of the head in the active position.
FIG. 14 is a schematic view of the tube in its deformed state.
FIG. 15 is a schematic similar to FIG. 14 with the parts moved to provide clearance.

Associated with the central axis A (FIGS. 4, 5, 6, and 13) is a forming and bending head 65 which includes cooperating upper and lower portions 62, 63 respectively. The portions 62, 63 are mounted for synchronous rotational oscillations in alternate directions about a central A and for reciprocal axial movement relative to each other. To this end the portions 62, 63 are mounted for reciprocal movement on guides 62' annd 63' respectively. The guides are adapted to be moved axially relative to each other by a cooperating mechanism 68. A drive means 71 associated with guide 63' is effective when the portions 62 and 63 are engaged to rotate the head 65 in alternate directions about the central axis A. Referring now to FIG. 13 it will be seen that the portions 62, 63 including the forming or shaping surfaces 66 thereon are diametrically arranged. At the proper time in the sequence of operation the portions 62, 63 are moved axially toward each other by mechanism 68 so that the surfaces come together and meet substantially in the plane C to clamp the tube 13 between the surfaces 66.

With the tube 13 held between the surfaces 66, the head 65 is rotated approximately 180° about a cam 67 centrally arranged on axis A in one direction until the advanced increment B of tube 13 is arranged substantially parallel to the following or subsequent portion 70 of tube 13.

In bending a tube having a diameter of 0.375 inches and a wall thickness of between 0.035 and 0.020 inches wherein the radius of the tube axis in the bend is approximately 0.565, means must be provided to prevent the movement or collapse of the tube wall in a radial direction to the bend due to the inability of the wall in the area of the outer curve to stretch an amount sufficient to maintain its radial position relative to the wall in the area of the inner curve. This collapsing of the tube walls is of course not acceptable in that it effects the design flow characteristics of refrigerant and means must be provided to prevent the collapsing of the tube 13 in the bend area 69.

Accordingly by the present invention, the portion 69 of the increment B that, as shown in FIG. 1, represents the return bend area in the completed heat exchanger 10 is deformed prior to bending operation. The portion 69 of spine fin tube 13 is deformed as shown in FIGS. 13 and 14 by the portions 62, 63 as they are brought together and accordingly only the spine fins in the return bend area are unduly deformed. To this end the surfaces 66 when brought together with sufficient pressure to deform the portion 69 are so dimensioned that the tube 13 will assume a cross sectional configuration resembling an oval or ellipse having a major axis D.

The major axis D of the deformed cross sectional configuration is parallel to the plane C and perpendicular thereto and to the central axis A. As can easily be understood with the deformed portion 69 positioned between the surfaces 66, the subsequent rotational movement of head 65 will cause the wall in the area of the outer curve to try to stretch to from the outer circumference of the completed bend. As mentioned hereinbefore during the bending operation the outer wall in its inability to stretch sufficiently to maintain its radial position relative with the inner wall, will move radially inwardly while at the same time the tube diameter along the minor axis expands so that the tube cross sectional configuration will tend to reform to substantially the original round configuration thereby maintaining a clear unobstructed design passageway. After the deforming operation the surfaces 66 are so spaced (FIG. 14) that they will allow the reshaping of the tube portion 69.

In the bending operation as increment B is bent about the central axis, the subsequent or following increment 70 of tube 13 adjacent the head 65 tends to move laterally from the longitudinal axis of the tube in a direction diametric to the bending operation.

Accordingly, with reference to FIGS. 5, 6, and 12, it will be seen that in fabricating the heat exchanger 10 in accordance with the present invention, means are provided to prevent movement of the portion 70 during the bending operation of increment B. A tube aligning mechanism 72 is mounted for lateral movement with the shifting mechanism 52 and more particularly to the plate 58. The aligning mechanism 72 includes a frame member 74 mounted on guide rods 80 which are slidably arranged in support blocks 82 secured to plate 58. Pivotally mounted on the frame 74 are a pair of arms 76 including tube holding blades or members 77. The arms 76 are pivoted at 79 on frame 74 at a position above the guide member 25 and tube 13. The arms 76 are moved alternatively by a pair of actuators 78 so that the members 77 engage the tube 13. Since lateral movement of tube 13 occurs in a direction diametric to the bending operation, the actuators 78 are energized alternatively so that the arm 76 and holding member 77, moved, engages a portion of subsequent increment B of the stationary tube side wall that in fact is an extension of the wall of the outer curve. It should be noted that members 77 are fabricated from relatively thin metal so that a minimum number of spine fins are deformed.

Referring to FIG. 6, in order to be effective in preventing lateral movement of tube 13 in portion 70, the member 76 should engage the tube wall portion adjacent the head 65 and in effect, during the bending operation the mechanism 72 is allowed to move forward on guide rods 80 from the position shown in FIG. 5 to that of FIG. 6. After the bending operation and prior to the next bending operation, the aligning mechanism 72 is positively retracted relative to the forming head 65 by an actuator 83. Prior to a bending operation the mechansim 72 is in its retracted position as shown in FIG. 5 and both holding members 76 are rotated or pivoted away from the tube 13. Immediately prior to the bending operation the appropriate members 76 are pivoted into engagement with the tube 13 in increment 70.

Figure 16:
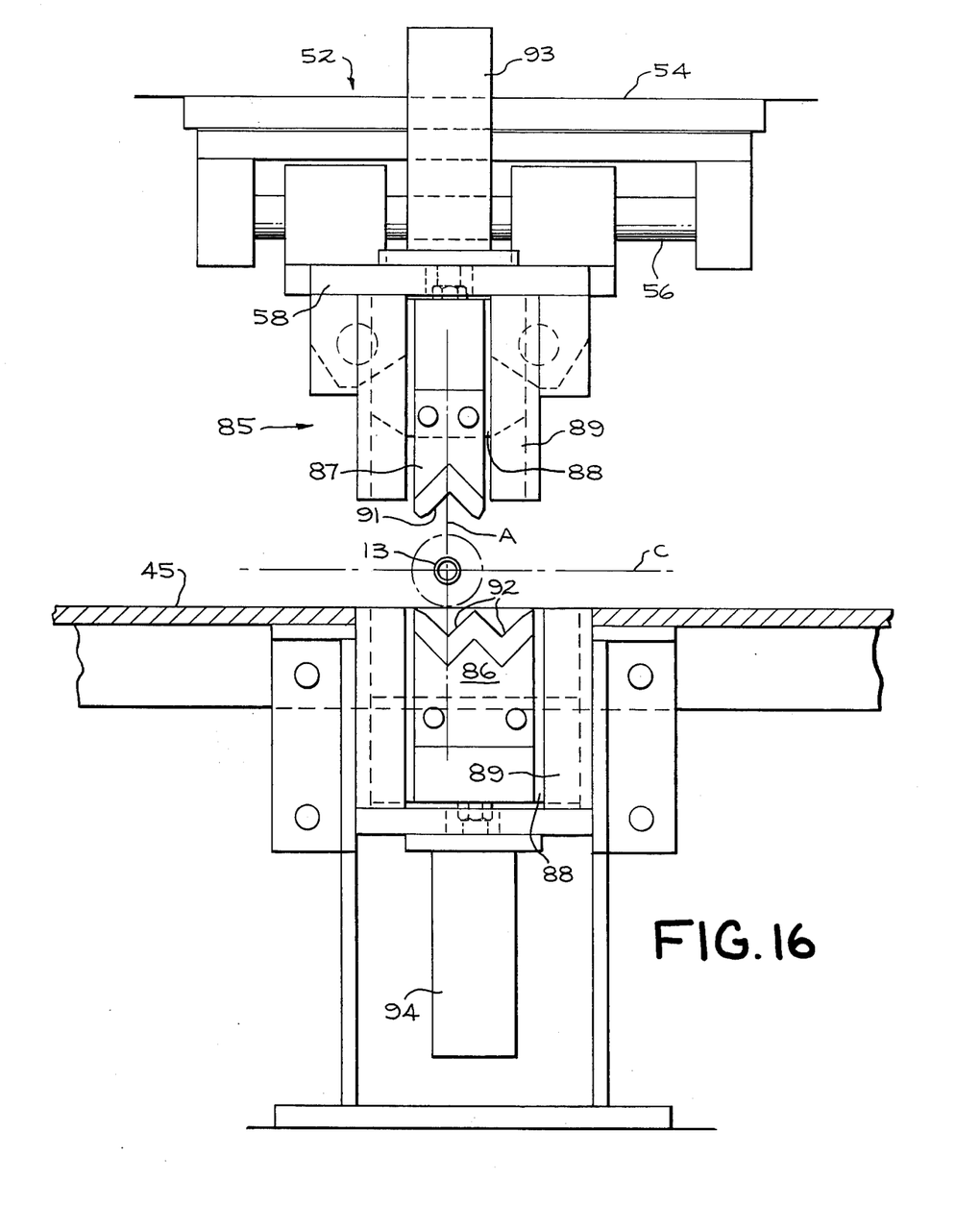
FIG. 16 is a sectional view taken along lines 16—16 of FIG. 6 showing the cutoff mechanism of the present invention.

After a predetermined number of alternate bending operations the heat exchanger 10 is cut from the continuous tube 13 so that another heat exchanger can be fabricated from the continuous tube 13. To this end a cutoff mechanism 85 is provided (FIG. 16) wherein a cutter 86 is located below the plane C of tube 13 and a cooperating cutter 87 is arranged above tube 13. Both of the cutters 86 and 87 are arranged for vertical movement on guides 88 formed in blocks 89. It should be noted that cutter 87, which is mounted on plate 54, is shifted laterally by the shifting mechanism so that upper cutter 87 moves laterally with, and is always properly positioned, over tube 13 and accordingly a single U-shaped cutting area 91 is provided. The lower stationary cutter 86 is provided with two cutting areas 92 so that the tube 13 is aligned with one of the cutting areas in either of its shifted positions relative to the central axis A. In operation, an actuator 93 effectively drives cutter 87 vertically downwardly while cutter 86 is driven upwardly by actuator 94 so that the cutting area 91 and the cooperating cutting area 92 are driven through the tube 13.

Figure 17:
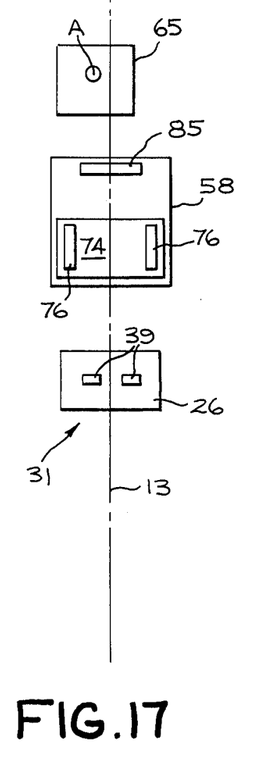
FIG. 17, 18, and 19 are schematic views showing different stages in forming the heat exchanger of the present invention.
Figure 18:
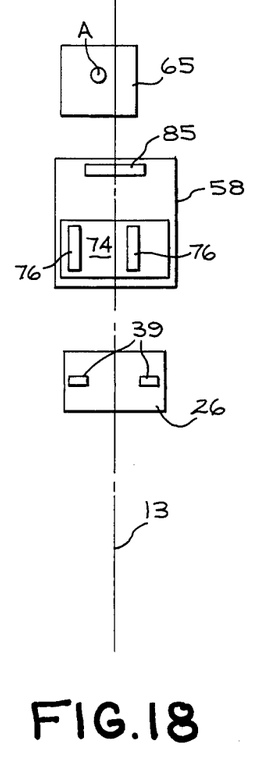
Figure 19:
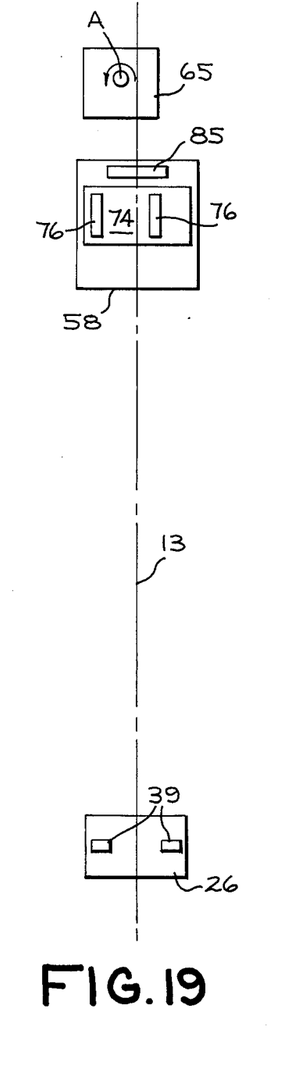

Referring now to FIGS. 17-19, there are shown the steps in fabricating the heat exchanger illustrated. In progressing through the forming of the heat exchanger, it will be assumed that to start with, the free end of a continuous spine fin tubing is located at a point adjacent the head 65 and more specifically at the point, a previously fabricated heat exchanger may have been cut off.

In operation, with the advancing portion 31 located longitudinally at a preselected location by an appropriate stop 43, the holding portion 39 is actuated to engage the tube and move it forward a preselected increment by action of the advancing mechanism 26. This forward movement of tube 13 is selected so that the trailing end or portion 69 of increment B forming the return bend is arranged between the shaping surface 66. The shifting mechanism 52 is the actuated to laterally arrange its associated mechanism including increment B of tube 13 and more specifically portion 69 to one side of the central axis A. The holding member 76 moves to engage the side wall of the subsequent tube portion to prevent movement of the stationary tube portion in a direction diametric to the bending direction. The advancing mechanism retracts to a preselected distance to engage an appropriately arranged stop. The head members 62, 63 move axially toward each other until the surfaces 66 engage portion 69 with sufficient pressure to deform the tubing into the generally oval configuration so that is has its major axis D arranged parallel with the plane C and perpendicular to the central axis A. The head 65 then rotates in one direction to form the first return bend of the head exchanger. The rotation of head 65 in each direction is substantially 180° so as to locate increment B parallel to the subsequent increment 70 of tube 13 to be bent. The above described steps are repeated until the desired number of return bends and length of heat exchanger 10 is attained, at which time the cutoff mechanism 85 is actuated and the heat exchanger 10 severed from the continuous tubing 13.

In adapting the apparatus to be used in an automatic production operation, the table portion 45 that supports the severed heat exchanger 10 is pivoted at 96 and rotated downwardly by an actuator 97 so that the completed heat exchanger 10 may slide down onto a convey system 100.

It should be apparent to those skilled in the art that the embodiment described heretofore is considered to be the presently preferred form of this invention. In accordance with the patent statutes, changes may be made in the disclosed apparatus and the manner in which it is used without actually departing from the true spirit and scope of this invention.

What is claimed is:

1. An apparatus for forming a serpentine heat exchanger having a predetermined length from a continuous tubing including a forming and bending head means for successively bending increments of said continuous tubing in alternate directions about a central axis comprising:

a. tube supply means for receiving said continuous tubing;

b. support means associated with said supply means for receiving said tubing with its longitudinal axis in a plane substantially perpendicular to said central axis;

c. tube shifting means arranged on said support means for lateral movement relative to said central axis for successively placing the increments of said tubing to be bent on alternate sides of said central axis, including holding means being movable alternatively into engagement with opposite side walls of said continuous tube diametric to the rotational direction of said forming head to prevent lateral movement of said continuous tubing during the bending operation while said increment is positioned substantially parallel with said continuous tube;

d. tube feed means arranged on said support means for advancing said tubing along its longitudinal axis in predetermined increments relative to said head so that a selected portion of said increment to be bent in said plane is arranged in cooperative relationship with said head means, including an advancing member slidably mounted on a guide member for longitudinal movement in a path parallel to said plane, tube holding means mounted on said advancing member being movable into engagement with said tubing when said feed means is in its retracted position relative to said central axis, stop means adjustably arranged longitudinally on one of said members positioned to cooperatively engage damping members on the other of said members when said feed means is in said retracted position to regulate the length of said increment advanced longitudinally relative to said central axis by said advancing member;

e. said head means including a pair of shaping elements diametrically arranged on said central axis on either side of said plane being dimensioned to deform said selected portion into an oval cross section having its major axis lying parallel with said plane;

f. drive means associated with said head means being operable when said selected portion is in the advanced position between said shaping elements for moving said head means longitudinally along said central axis to move said shaping elements into engagement with said selected portion of said tube with sufficient pressure to deform said portion into said oval cross section; and means for imparting a successive rotational oscillation to said head means in one direction while the shaping elements are in engagement with said selected portion to bend said increment in said selected portion substantially 180° about said central axis so that said increment is substantially parallel to said continuous tubing;

g. cutoff means positioned relative to said continuous tubing being movable radially through said longitudinal axis including a first cutter on one side of said plane arranged for cooperatively engaging a second cutter on the other side of said plane, said first cutter is mounted for lateral movement with said shifting means and said second cutter includes a plurality of cutting area so that said first cutter is aligned with one of said cutting areas, means for moving said cutters perpendicular to said plane and through said tubing to sever said heat exchanger from said continuous tube after a predetermined number of successive bending operations.

2. The apparatus of claim 1 wherein said tube supply means includes a receiving area for holding a variable predetermined length of said tubing and to direct said tubing to said support means as it is advanced in increments by said tube feed means;

control means arranged in said receiving area to regulate the length of tubing in said receiving area to maintain said tubing in said receiving area within said variable predetermined length.

3. The apparatus of claim 2 wherein a guide means is arranged in the path of travel of said tubing intermediate said supply means and said support means including a plurality of diametrically positioned rollers located so that the longitudinal axis of the tubing is arranged in a substantially straight line as it passes through successive rollers.

* * * * *